(12) United States Patent
Baba

(10) Patent No.: US 7,661,865 B2
(45) Date of Patent: Feb. 16, 2010

(54) LIQUID CRYSTAL DISPLAY BACKLIGHT AND LIQUID CRYSTAL DISPLAY DEVICE

(75) Inventor: Masatake Baba, Kanagawa (JP)

(73) Assignee: NEC LCD Technologies, Ltd., Kanagawa (JP)

( * ) Notice: Subject to any disclaimer, the term of this patent is extended or adjusted under 35 U.S.C. 154(b) by 0 days.

(21) Appl. No.: 12/253,261

(22) Filed: Oct. 17, 2008

(65) Prior Publication Data

US 2009/0103283 A1 Apr. 23, 2009

(30) Foreign Application Priority Data

Oct. 17, 2007 (JP) ............................. 2007-270624
Sep. 25, 2008 (JP) ............................. 2008-246064

(51) Int. Cl.
*G02F 1/13357* (2006.01)
(52) U.S. Cl. ...................... 362/610; 362/608; 362/609; 362/294; 362/218; 362/97.2
(58) Field of Classification Search ......... 362/608–610, 362/294, 373, 218; 349/65–71
See application file for complete search history.

(56) References Cited

U.S. PATENT DOCUMENTS

| 6,402,347 | B1 * | 6/2002 | Maas et al. | ................... 362/294 |
| 7,438,450 | B2 * | 10/2008 | Aoki et al. | .................... 362/373 |
| 7,513,649 | B2 * | 4/2009 | Sotokawa et al. | ............ 362/263 |
| 7,513,661 | B2 * | 4/2009 | Hamada et al. | ............. 362/373 |
| 7,527,408 | B2 * | 5/2009 | Hwang | ........................ 362/609 |
| 7,547,123 | B2 * | 6/2009 | Kittredge et al. | ............. 362/373 |

FOREIGN PATENT DOCUMENTS

| JP | 2004-055229 | 2/2004 |
| JP | 2004-193002 | 7/2004 |
| JP | 2004-527096 | 9/2004 |
| JP | 2004-311791 | 11/2004 |
| JP | 2005-340065 | 12/2005 |

OTHER PUBLICATIONS

Martynov et al., "43.3: High-efficiency slim LED backlight system with mixing light guide", SID 2003 Digest, pp. 1259-1261.

* cited by examiner

*Primary Examiner*—Anabel M Ton
(74) *Attorney, Agent, or Firm*—Young & Thompson

(57) ABSTRACT

To provide a liquid crystal display backlight and a liquid crystal display device, which can improve the heat dissipating effect, can reduce the thickness and weight of the device. The liquid crystal display backlight includes: an emission light guide plate for emitting illuminating light for a liquid crystal display panel from one face; one and other mixed-color light guides mounted on a same plane of other face of the emission light guide plate via a spacer; a heat-dissipating spatial area provided between the mixed-color light guide plates; light-emitting devices disposed within the heat-dissipating spatial area; and reflectors for guiding output light, propagated inside each mixed-color light guide plate, towards corresponding end faces of the emission light guide plate from outside end face of each mixed-color light guide plate. A holding plate for holding the light-emitting devices is provided, facing each mixed-color light guide plate with an airing gap provided therebetween.

15 Claims, 13 Drawing Sheets

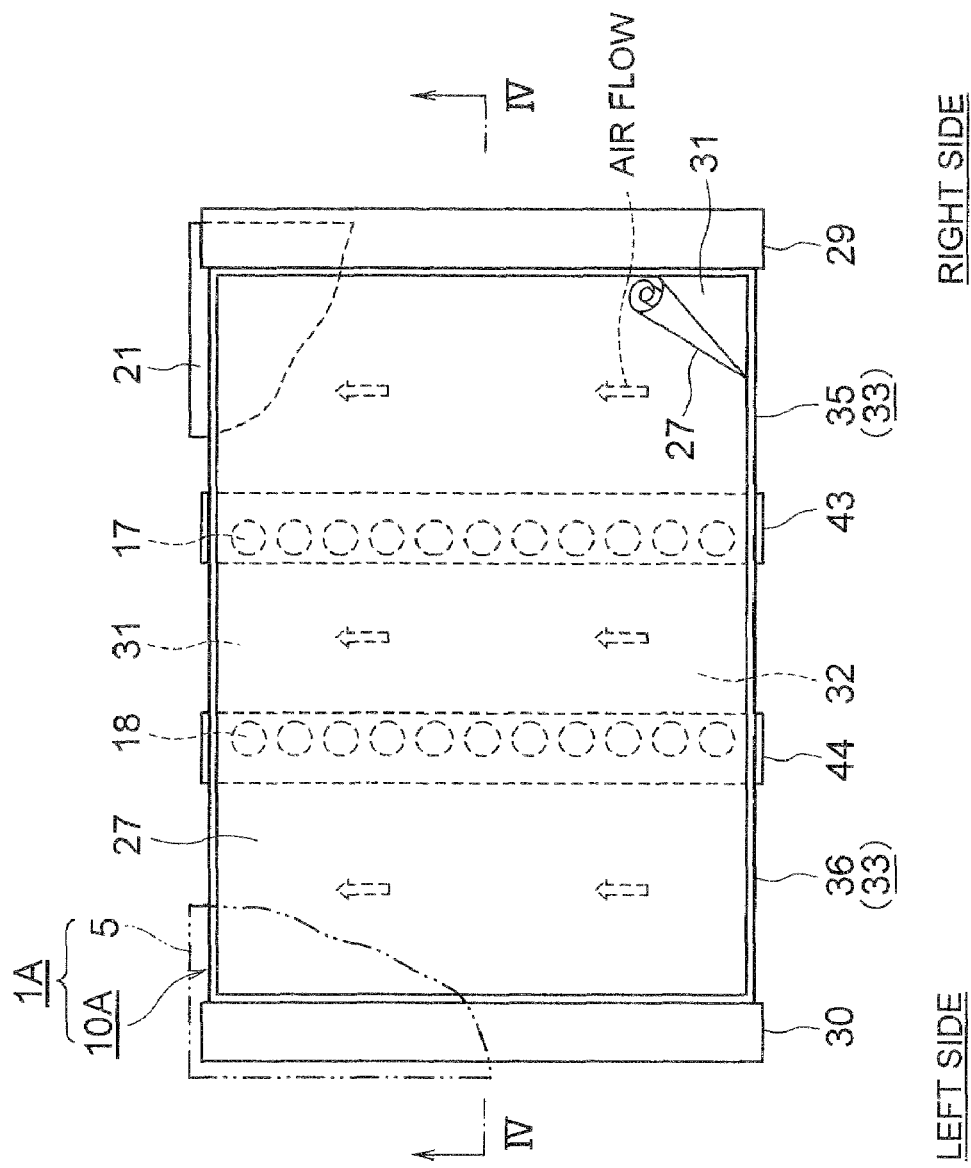

LIQUID CRYSTAL DISPLAY BACKLIGHT AND LIQUID CRYSTAL DISPLAY DEVICE

CROSS-REFERENCE TO RELATED APPLICATIONS

This application is based upon and claims the benefit of priority from Japanese patent application No. 2007-270624, filed on Oct. 17, 2007, and Japanese patent application No. 2008-246064, filed on Sep. 25, 2008, the disclosure of which is incorporated herein in its entirety by reference.

BACKGROUND OF THE INVENTION

1. Field of the Invention

The present invention relates to a liquid crystal display backlight and a liquid crystal display device. More specifically, the present invention relates to a small liquid crystal display backlight having a fine heat dissipative characteristic and to a liquid crystal display device.

2. Description of the Related Art

Conventionally, a cold cathode tube has been mainly used as a backlight light source of a liquid crystal display device. However, in that case, it is necessary to have an exclusive lighting circuit and to deal with a high voltage. Therefore, recently, an LED (light-emitting diode) is used especially for small devices such as a portable telephone and a PDA. The LED provides pseudo white light that is obtained by applying YAG phosphor mainly to a blue LED, and it has a difficulty in terms of color reproducibility (particularly in reds). The LED has not been used often as a monitor and for a TV, because it has only a small amount of light, is more expensive than the cold cathode tube, and has difficulty in terms of the color reproducibility as described above.

However, recently, the efficiency of the LED has been improved dramatically. At the same time, an LED capable of conducting a large electric current has been developed. Associated with the environmental issues and achieving expanded color reproducibility, there has been an active movement to try to produce a relatively large backlight using the LEDs.

A compact lighting system and a display device are known (see Japanese Patent Application Publication 2004-527069 (Patent Document 1), for example) as a lighting unit that uses the liquid crystal display backlight described above. Patent Document 1 discloses a lighting system which uses a plurality of LEDs provided between light-mixing panel parts 151 and 152 which are disposed on a same plane via a spatial area, as in a structure shown in FIG. 12, for example.

That is, the lighting system shown in FIG. 12 includes a light-emitting panel 101 and a pair of mixing panels 151, 152, and LEDs 106 are arranged in two rows as a light source. The LEDs 106 are configured with first and second light-source sections 161 and 162. The light emitted from the first and second light-source sections 161, 162 makes incident on each of the panel parts 151, 152 from each of a first and second light input edge areas 171, 172 of the light-mixing panel parts 151, 152 via respective light collimators 161A, 162A.

The light made incident on the light-mixing panels 151, 152 repeats total reflection within the light-mixing panels 151, 152, and it is emitted from a light output edge areas 181, 182 on the end faces of opposite sides to light transfer chambers 191, 192 to be sent to the light-emitting panel 101 from the respective light output edge areas 181, 182.

Note here that reference numerals in FIG. 12 are numerals obtained by adding "100" to the reference numerals applied in FIG. 3B of Patent Document 1, and the structures thereof are completely the same. Numeral references (161A, 162A) for the light collimators, however, are reference numerals obtained by simply adding A, B to the original numeral references (161, 162) of Patent Document 1.

FIG. 1 and FIG. 2 of SID 2003 DIGEST, pp. 1259-1261 (Non-Patent Document 1) disclose a technique for building an area light source in which: LEDs having a dome-type lens are arranged in an array; output light from the LEDs is guided to a first light guide plate via a reflector (light reflection guide); and the light is sent to a second light guide plate (light-emitting plate) via another reflector.

In the lighting system disclosed in Patent Document 1 described above, the two rows of light-source sections 161, 162 are provided neighboring to each other with the light collimators 161A, 162A for reflecting the light from the light-source sections 161, 162 being in contact with each other.

The two rows of light-source sections 161 and 162 are provided for obtaining intensified brightness by mounting the double LEDs. However, the light-source sections 161 and 162 are very close to each other, so that the durability is deteriorated greatly because of the heat generated from each other, etc. In addition, the brightness thereof cannot simply be doubled. In order to lighten and eliminate the influences of the heat, a heat dissipation device is required.

However, there is no specific disclosure in Patent Document 1 regarding such heat dissipation device. For mounting a heat dissipation structure to the lighting system disclosed in Patent Document 1, it is necessary to provide a required heat dissipation device on the outer side of the two rows of light-source sections 161 and 162. If so, the whole device comes to have increased thickness, scale, and weight, which makes it difficult to thin and lighten the device. Such shortcomings exist also in Non-Patent Document 1 mentioned above.

SUMMARY OF THE INVENTION

An exemplary object of the present invention is to provide a liquid crystal display backlight and a liquid crystal display device, which can improve the shortcomings of the above-described related techniques, improve the heat dissipation effect with a simple structure, and reduce the thickness and the weight thereof.

In order to achieve the foregoing exemplary object, a liquid crystal display backlight according to an exemplary aspect of the invention includes: an emission light guide plate for emitting illuminating light for a liquid crystal display panel from one face; one mixed-color light guide plate and other mixed-color light guide mounted respectively on a same plane of other face of the emission light guide plate via a spacer; a heat-dissipating spatial area provided between the one and the other mixed-color light guide plates; a plurality of light-emitting devices disposed within the heat-dissipating spatial area; and one reflector and other reflector for guiding output light from each of the light-emitting devices propagated inside the one and the other mixed-color light guide plates towards corresponding end faces of the emission light guide plate from outside end faces of each of the mixed-color light guide plates. Further, a holding plate for holding each of the plurality of light-emitting device as one body is provided, and the holding plate is disposed to face the one and the other mixed-color light guide plates with an airing gap provided therebetween.

The holding plate may be formed in a size corresponding to the emission light guide plate.

Further, the heat-dissipating spatial area may be set to be communicated with the airing gaps.

With this, the air circulated within the airing gaps flows directly into the heat-dissipating spatial area directly, so that the hot air does not stay within the heat-dissipating spatial area. Thus, the heat-dissipating spatial area can effectively function as the heat-dissipating space.

Further, the one and the other reflectors may be placed to be in parallel to each other; and one and the other mixed-color light guide plates may be formed and mounted to the emission light guide plate in such a manner that the heat-dissipating spatial area becomes in parallel to each of the reflectors.

Furthermore, the heat-dissipating spatial area may be provided to be non-parallel to the reflectors.

With this, the heat-dissipating space can be set to expand gradually. Thus, in addition to having no obstacle in the rising direction of the natural convection of the air, the heat generated and arise from the plurality of light-emitting elements can be caught in the wide space. Therefore, the heat can be diffused more efficiently.

Furthermore, the light reflection guide, the light-emitting devices, and side end faces of the heat-dissipating spatial area corresponding thereto may be bent.

With this, the heat-dissipating space becomes bent, so that the heat can be efficiently dissipated at each area sectioned by each bent point as a boundary without reducing the number of light-emitting devices.

Further, the heat-dissipating spatial area may be set to be tilted by a prescribed angle of α degree with respect to the reflectors.

With this, the length of the heat-dissipating spatial area is set longer than that of the emission light guide plate, so that the number of light-emitting devices disposed within the heat-dissipating spatial area can be increased largely. As a result, the brightness of the output light from the emission light guide plate can be increased further.

Furthermore, the plurality of light-emitting devices may be arranged separately at least in two rows by corresponding to the one and the other mixed-color light guide plates.

This makes it possible to send the output light separately to the both end faces of the emission light guide plate via the respective mixed-color light guide plate and the reflector, so that the brightness of the output light from the emission light guide plate can be increased further.

Furthermore, a light reflection guide (guiding reflector) for guiding the output light from the plurality of light-emitting devices in each of the rows to end faces of each of the mixed-color light guide plates on the heat-dissipating spatial area side may be provided for each row of the plurality of light-emitting devices.

With this, the output light from each of the light-emitting devices can be guided towards the mixed-color light guide plate by the guiding reflector. Therefore, the effective output light from each of the light-emitting device can be increased.

Further, a heat-dissipating auxiliary device may be provided within the heat-dissipating spatial area for the holding plate that also functions as a heat dissipation device.

The heat-dissipating auxiliary device may be configured with a heat-dissipating heat sink or a cooling fan.

Furthermore, a great number of uneven shapes may be provided on at least one face of the holding plate described above. With this, since the surface area of the holding plate can be increased, it becomes possible to dissipate the heat from the large surface, which makes it possible to improve the heat dissipating effect with a simple structure.

Moreover, assuming that distance between an end face of the light reflection guide side (incident side) of the mixed-color light guide plate, and an end face of the reflector side is D, arranging pitch of the LEDs is P, and light distribution angle (half-value angle) of the LEDs is θ, the distance D can be set to satisfy an expression "$D \geq n \times P / \tan(\theta/2)$" (n: number to the closest same-color light-emitting device).

With this, the heat-dissipating spatial area can be formed in an extremely large size by forming the mixed-color light guide plates in the optimum and minimum necessary size.

Furthermore, in order to achieve the foregoing object, a liquid crystal display device according to another exemplary aspect of the invention includes a liquid crystal display panel and a backlight disposed in back side of the liquid crystal display panel for supplying display irradiation light for the liquid crystal panel, wherein the backlight is one of the liquid crystal display backlights described above.

BRIEF DESCRIPTION OF THE DRAWINGS

FIG. 2 is a fragmental explanatory illustration, in which

FIG. 3 is a schematic front elevational view showing a second exemplary embodiment of the liquid crystal display backlight and the liquid crystal display device according to the invention;

FIG. 11 shows illustrations showing an uneven part of a holding plate, in which

DETAILED DESCRIPTION OF THE EXEMPLARY EMBODIMENTS

First Exemplary Embodiment

Hereinafter, a first exemplary embodiment of a liquid crystal display backlight according to the invention will be described by referring to FIG. 1-FIG. 2.

Figure 1:
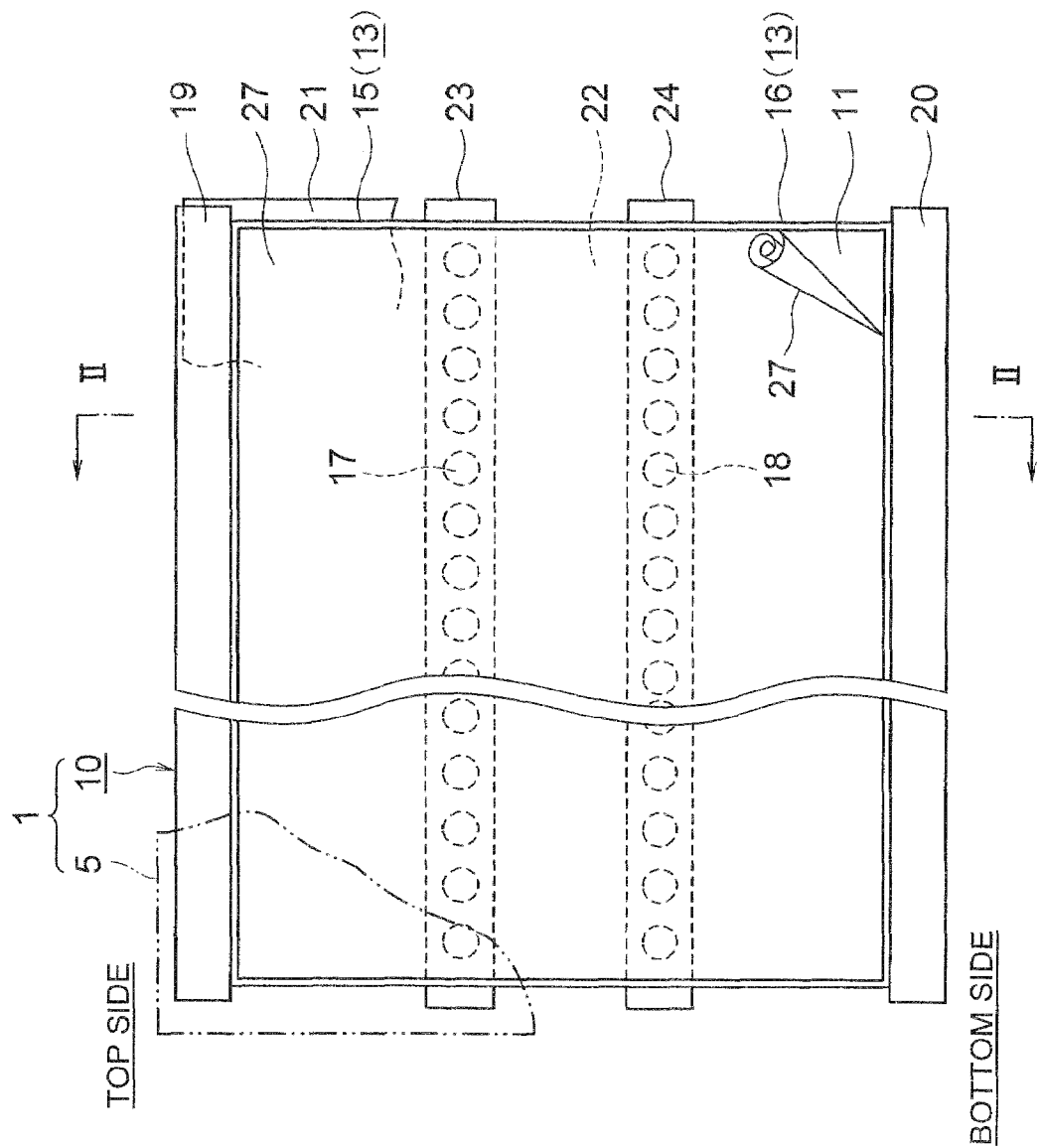
FIG. 1 is a schematic front elevational view showing a first exemplary embodiment of a liquid crystal display backlight and a liquid crystal display device according to the invention.

FIG. 1 is a front elevational view showing the liquid crystal display backlight according to the first exemplary embodiment, and FIG. 2 is a longitudinal section taken along a line II-II of FIG. 1.

In FIG. 1 and FIG. 2, reference numeral 1 indicates a liquid crystal display device, reference numeral 5 indicates liquid crystal display panel which outputs and displays various information towards outside, and reference numeral 10 indicates a liquid crystal display backlight provided as one body with the liquid crystal display panel.

The liquid crystal display backlight 10 includes: a emission light guide plate 11 which emits illuminating light for the liquid crystal display panel 5 from one side (the surface facing towards the liquid crystal display panel 5) towards the liquid crystal panel 5; and a mixed-color light guide plate 13 which is mounted on the other surface (back face) of the emission light guide plate 11 by being stacked therewith via a light isolator plate 12 serving as a spacer member. As shown in FIG. 2, the mixed-color light guide plate 13 is configured with a mixed-color light guide plate 15 and the other mixed-color light guide plate 16 which are mounted on a same plane with a prescribed space (a spatial area for dissipating heat to be described later) provided therebetween. A same size plate is used for each of the mixed-color light guide plates 15 and 16 in this exemplary embodiment.

A heat-dissipating spatial area 22 is provided between each of the mixed-color light guide plates 15 and 16. A plurality of light-emitting devices (LEDs) 17 and 18 as emission light sources of the liquid crystal display backlight are provided within the heat-dissipating spatial area 22. Further, on the outer end faces of each of the mixed-color guide plates 15, 16, mounted are a reflector 19 and the other reflector 20 which respectively guide light outputted from each of the LEDs 17, 18 propagated inside the each of the mixed-color light guide plates 15, 16 towards the corresponding outer-side end faces of the emission light guide plate 11.

Thereby, the output light from each of the LEDs 17, 18 propagated within each of the mixed-color light guide plates 15, 16 is reflected and propagated within each of the reflectors 19, 20 as in small arc arrows so as to be propagated within the emission light guide plate 11 from the respective outer-side end faces of the emission light guide plate 11.

Reference numeral 21 indicates a holding plate. This holding plate 21 is mounted to hold each of the LEDs 17, 18 in a united manner, and it is placed to face the above-described mixed-color light guide plate 13 (each of the mixed-color light guide plates 15, 16) and to have airing gaps 22A, 22B in a space of C formed therebetween, as shown in FIG. 2. With this, heat generated when each of the LEDs 17 and 18 is in operation can be propagated to the holding plate 21. This holding plate 21 also functions as a heat dissipation device.

For the holding plate 21, this exemplary embodiment uses a plate that is in a size corresponding to the size of the emission light guide plate 11 described above (almost in a same size). Further, the above-described heat-dissipating spatial area 22 is set to be in a communicable state with the airing gaps 22A, 22B. That is, an air-cooling mechanism is configured with the heat-dissipating spatial area 22 and the airing gaps 22A, 22B, and the heat generated from each of the LEDs 17, 18 is smoothly heat-exchanged with the air circulating within the gaps 22A, 22B along the holding plate 21 and dissipated from the holding plate 21 that functions as the heat dissipation device.

Each of the reflectors 19 and 20 described above are arranged to correspond to both ends (top end and bottom end in FIG. 1 and FIG. 2) of the emission light guide plate 11 and to keep a parallel state, as shown in FIG. 1 and FIG. 2.

In this exemplary embodiment, each of the above-described light guide plates 15, 16 are formed and mounted to the above-described emission light guide plate 11 in such a manner that the heat-dissipating spatial area 22 becomes also in parallel to each of the reflectors 19, 20.

Further, as shown in FIG. 1, the emission light guide plate 11 of this exemplary embodiment is formed in a rectangular shape. Each of the reflectors 19 and 20 is disposed in a side-end face part corresponding to the long sides of the emission light guide plate 11 that is formed in a rectangular shape. In accordance with this, each of the mixed-color light guide plates 15 and 16 is formed in a rectangular shape (rectangle) to have its width in a length that is one half or less of the width of the emission light guide plate 11.

Therefore, the length of the heat-dissipating spatial area 22 makes it equal to the length of the long side of the emission light guide plate 11. Thus, more number of LEDs 17 and 18 can be provided than a case where the heat-dissipating spatial area 22 is provided to the short side. This provides such an advantage that the brightness of the light outputted from the emission light guide plate 11 to the liquid crystal display panel 5 can be increased.

The light made incident on the emission light guide plate 11 is diffusively reflected towards the surface by a diffusing/reflecting device (not shown) that is formed on a plane part (one of or both of the light isolator plate 12 side and optical sheet 27 side) except for the side face, and it is emitted successively towards the above-described liquid crystal display panel from the emission light guide plate 11. In this process, the output light can have almost uniform separation characteristic. Furthermore, the optical sheet 27 is provided on the surface of the emission light guide plate 11 in this exemplary embodiment in order to improve the uniformity, to control the transmission angle, etc.

The above-described heat-dissipating spatial area 22 is arranged in the center of the back-face side of the emission light guide plate 11, when viewed from the emission light guide plate 11 side. On the back-side face of the emission light guide plate 11, there are the heat-dissipating spatial area 22 provided in the center part, one of the mixed-color light guide plate 15 provided on one side, and the other mixed-color light guide plate 16 provided on the other side on a same plane.

In the first exemplary embodiment, the above-described plurality of LEDs (light-emitting devices) 17, 18 are arranged separately in at least two rows by corresponding to each of the mixed-color light guide plates 15, 16. Further, guiding reflectors 23, 24 are provided to respective rows of the plurality of LEDs as light reflection guides for guiding the output light from the plurality of LEDs in the respective rows towards the end faces of the heat-dissipating spatial area 22 side of the respective mixed-color light guide plates 15, 16.

As the guiding reflectors (light reflection guides) 23 and 24, a material that causes less light loss (silver-deposited film, resin multi-layered film, or a metal film to which those types of film is laminated, etc.) is used.

By providing each of the guiding reflectors 23, 24 to the LEDs 17, 18 of the respective rows in the manner described above, the output light from each of the LEDs 17, 18 can be guided with the guiding reflectors. Therefore, the entire output light emitted from each of the LEDs 17, 18 towards the surroundings can be efficiently utilized.

Further, as described above, on the end faces of each side (top face and bottom face in FIG. 2) at the locations common to the emission light guide plate 11 and the mixed-color light guide plate 13, the upper-side reflector 19 as one of the reflectors and the lower-side reflector 20 as the other side are provided respectively for sending the mixed-color light emitted from each end faces 15B, 16B of the respective mixed-color light guide plates 15, 16 of the mixed-color light guide plate 13 side towards each of the end faces positioned at the same location on the emission light guide plate 11 side. For those reflectors 19, 20, a material exhibiting as small light loss as possible is used as the material, as in the case of the guiding reflectors 23, 24.

Note here that each of the above described mixed-color light guide plates 15, 16 is required only to propagate the light from the plurality of LEDs 17, 18 as the light-emitting devices on each row. Thus, basically, no scattering/diffusing pattern is necessary on the surface thereof.

Further, the light emitted from each of the mixed-color light guide plates 15, 16 is reflected by the upper-side reflector 19 and the lower-side reflector 20 as described above The traveling direction is changed by about 180 degrees, so that the light is guided to the emission light guide plate 11, respectively, as described above.

Furthermore, as described above, a plurality of LEDs 17 on one row and a plurality of LEDs 18 on the other row are arranged, respectively, by being adjacent to each other and along each side end faces 15A, 16A of the mixed-color light guide plates 15, 16 within the heat-dissipating spatial area 22.

As each of the above-described LEDs 17, 18, a surface-mount type with a lens (for example, Luxeon Emitter, Lambertian (product of Lumileds)) is used. Each row is configured as a set of a plurality of LEDs for emitting colors of RGB, which is arranged in a lateral direction in a proper layout as shown in FIG. 1. As a whole, as in FIG. 1, the LEDs are arranged in two rows in a horizontal direction with a prescribed space.

As described above, the guiding reflectors 23, 24 are mounted to the LEDs 17, 18 of each row. The guiding reflectors 23, 24 can effectively guide the output light from the LEDs 17, 18 to each of the end faces 15A, 16A of the respective mixed-color light guide plates 15, 16.

In practice, each of the LEDs 17, 18 arranged in the two rows are attached to the flat holding plate 21 via a substrate 25, as shown in FIG. 2. Further, as described above, the holding plate 21 is disposed to face each of the mixed-color light guide plates 15, 16 disposed on a same plane, while having a prescribed space C provided therebetween. The spatial area formed by the space C configures the airing gaps 22A, 22B as described above.

The holding plate 21 in the first exemplary embodiment is formed to have equal size for the width from the upper-side reflector 19 to the lower-side reflector 20 and the length of the guiding reflectors 23, 24. Further, it is desirable for the holding plate 21 to use a material having high heat conductivity and small specific gravity, e.g., a metal type such as aluminum, and to have a thickness of 3 mm or more. Alternatively, the thickness of the plate may be changed as appropriate (for example, set as 3 mm or less) depending on the driving current of the LEDs 17, 18, calorific value, junction temperature, and the like.

As described above, the heat-dissipating spatial area 22 is formed between the opposing side-end faces 15A, 16A of each of the mixed-color light guide plates 15, 16. This heat-dissipating spatial area 22 also functions as the heat-dissipating space for the LEDs 17, 18 arranged in two rows. As a result, the air within the heat-dissipating spatial area 22 can be sufficiently permeated since the top and bottom end parts of the airing gap 22A, 22B communicated therewith are let open, as shown in FIG. 2. Therefore, the holding plate 21 can be cooled effectively, so that the heat generated by the LEDs 17, 18 can be effectively diffused.

Note here that it is preferable for the area between the mixed-color light guide plates 15, 16 and the holding plate 21 (i.e., the airing gaps 22A, 22B, back-face side of the holding plate 21, or the heat-dissipating spatial area 22) to be exposed to the air. Even when another member or the like is to be mounted, it is preferable to avoid placing it in touch or very close to the holding plate 21 as much, as possible.

With this, the heat transmitted to the holding plate 21 can be effectively diffused to the air by the holding plate 21 that also functions as the heat dissipation device.

As described, in the liquid crystal display backlight 10 according to the first exemplary embodiment, the two rows of LEDs 17, 18 are disposed within the heat-dissipating spatial area 22 to be almost in parallel to the upper-side reflector 19 and the lower-side reflector 20. As it is obvious from this, the heat-dissipating spatial area 22 is set to be in parallel to both of the reflectors 19, 20.

In the liquid, crystal display backlight 10 of the above-described structure, a liquid crystal panel 5 is provided in advance on the front side of the irradiation-light output side. The liquid crystal display device 1 of the first exemplary embodiment is configured by combining the liquid crystal display backlight 10 and the liquid crystal display panel 5.

Next, the overall operations of the above-described liquid crystal display backlight 10 according to the first exemplary embodiment will be described.

As shown in FIG. 2, the light generated by having each of the LEDs 17, 18 turned on is reflected by the guiding reflectors 23, 24 to be guided to the respective mixed-color light guide plates 15 and 16. The light passed through the mixed-color light guide plates 15, 16 has its traveling direction changed by 180 degrees at the reflectors 19, 20 to be guided to the emission light guide plate 11. The light is then converted to uniform surface emitting light, and irradiated towards the liquid crystal display panel 5 from the above-described optical sheet 27.

In this case, heat is generated in the LEDs 17, 18 when the LEDs 17, 18 are turned on. The heat is transmitted to the holding plate 21 from the LEDs 17, 18 through the substrate 25. In the meantime, there is a flow of air generated on the back-face side of the holding plate 21, the surface side of the holding plate 21, the above-described gaps 22A, 22B, and the heat-dissipating spatial area 22. Therefore, the holding plate 21 has the heat dissipated by heat exchange, so that it is cooled. As a result, the whole surface of the holding plate 21 is cooled, so that it is unnecessary to have a heat sink attached thereto, for example. This makes it possible to improve the heat dissipating effect with a simple structure. At the same time, it is possible to reduce the thickness and weight of the liquid crystal display backlight 10 as a whole, since it is provided with the holding plate 21 that has a heat diffusing function.

(Relation Between Path Length of Mixed-Color Light Guide Plates 15, 16 and LED Arranging Pitch, Etc)

Figure 2A:
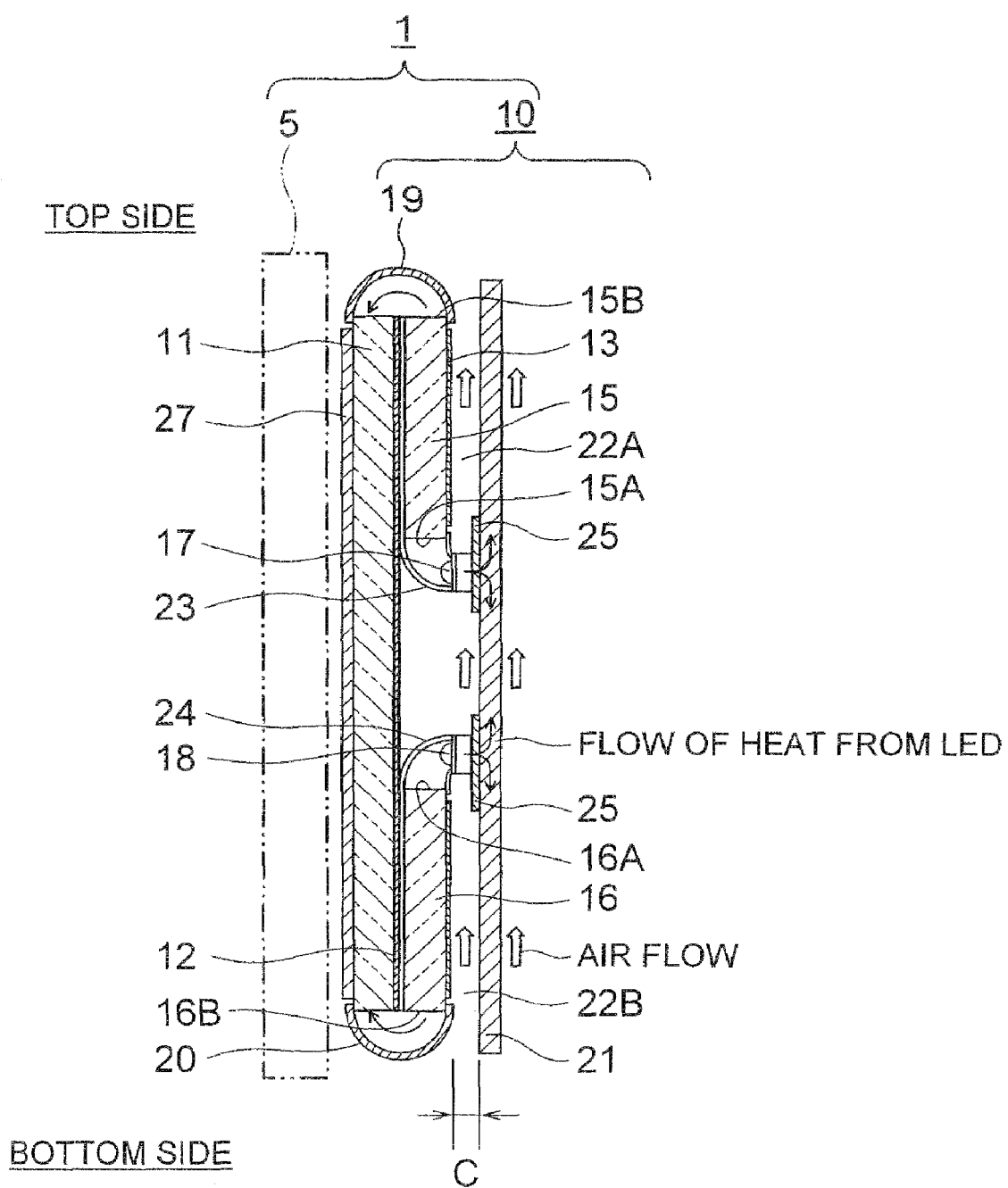
FIG. 2A is a longitudinal section taken along a line II-II of FIG. 1.

In the first exemplary embodiment, the heat-dissipating spatial area 22 disclosed in FIG. 2A is a spatial area formed with a cut-off part by isolating each of the mixed-color light guide plates 15, 16, and it is surrounded by the emission light guide plate 11, each of the side-end faces (faces opposing to each other) 15A, 16A of the mixed-color light guide plates 15, 16, and the holding plate 21 arranged with a prescribed size of space C provided therebetween.

The heat generated by the LEDs can be diffused efficiently when the heat-dissipating spatial area 22 can be expanded as much as possible.

In this case, the above-described airing layered gap 22B communicated with the heat-dissipating spatial area 22 is substantially regulated by the LEDs to be used, so that there is almost no versatility in designing. However, the heat-dissipating spatial area 22 can be formed in a very large size by forming the mixed-color light guide plates 15, 16 in the optimum and minimum necessary size.

Hereinafter, this will be described by referring to a case of the mixed-color light guide plate 15, regarding the relation and the like between the LED arranging pitch P and the size of the mixed-color light guide plate.

Figure 2B:
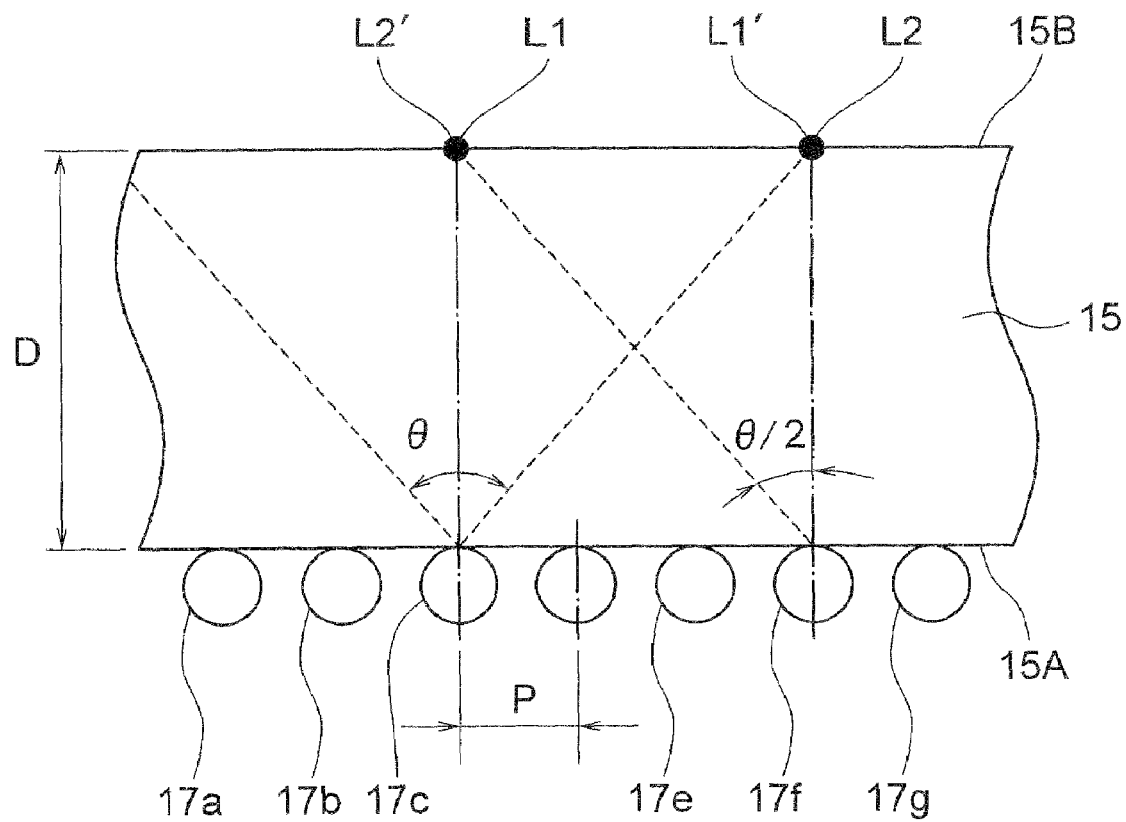
FIG. 2B is a schematic illustration showing a positional relation between a mixed-color light guide plate and LED arranging pitch.

First, in FIG. 2B, it is supposed that the distance between the side-end face 15A of the mixed-color light guide plate 15 on the guiding reflector 23 side and the side-end face 15B of the mixed-color light guide plate 15 on the upper-side reflector 19 side is D, the LED arranging pitch is P, and the light distribution angle (half-value angle) of the LEDs 17 is θ.

The light distribution angle (half-value angle) of the LED means a range of angles that can maintain 50% luminosity with respect to the peak luminosity of the LED. The angle of the LED used as the liquid crystal display backlight, as a way of example, is 110 degrees or 120 degrees (but not limited to these angles). For example, regarding the light emitted from the LED having 0-degree peak angle (having peak in the perpendicular direction of the LED light emission part) and the 120-degree half-value angle, only a half the light reaches a point L2 that is at "θ/2" degree (i.e., 60 degrees) with respect to a point L1 where the peak luminance reaches.

If "D" of the mixed-color light guide plate 15 can be formed sufficiently large, sufficiently mixed light can be guided regardless of the LED arranging pitch P. However, that causes many inconveniences, e.g., sufficient heat-dissipating spatial area 22 shown in FIG. 2A cannot be secured, the weight and cost are increased, etc. Thus, "D" of the mixed-color light guide plate may be set in a size with which the light from the LEDs having the same emission color become mixed in order to be in the optimum size.

Assuming that the luminosity of the light emitted from the LED at L1 is 1 and the luminosity at L2 is 0.5, substantially uniform emission color can be obtained when a point L1' corresponding to the above-described point L1 emitted from the closest neighboring LEDs of the same color is consistent with the above-described point L2, and a point L2' corresponding to the point L2 is consistent with the above-described point L1 at least.

This can be expressed with a following expression (a) regardless of the characteristics of the LEDs to be used, such as the half-value angle.

$$D \geq n \times P / \tan(\theta/2) \quad (a)$$

Note here that n indicates the number of LEDs to the neighboring same-color LED.

In the case of FIG. 2B, when it is assumed that the angle θ of the LED is 120 degrees, P is 10 mm, and the LED 17c and the LED 17f are of the same color, n equals to 3. As a result, it can be found from Expression (a) that the distance D may be set as 17.3 mm or more.

As described, in the first exemplary embodiment, the heat-dissipating spatial area 22 is provided between each of the mixed-color light guide plates 15, 16 which are mounted on the same plane to be stacked on the back-face side of the emission light guide plate 11, and each LED is disposed within the heat-dissipating spatial area 22. At the same time, the holding plate 21 for holding each of the LEDs is arranged to face each of the mixed-color light guide plates 15, 16 via the airing gaps 22A, 22B. Therefore, the holding plate 21 is cooled by heat exchange with the air circulating within the airing gaps 22A, 22B, so that the heat generated from the LEDs via the holding plate 21 can be diffused to the air. With this, the heat dissipating effect can be improved with a simple structure.

At the same time, in the present invention, the holding plate 21 is disposed along each of the mixed-color light guide plates 15 and 16, as described above. Thus, the heat generated in each of the LEDs can be discharged to the outside effectively, even though there is no externally protruded part. In addition, even though the holding plate 21 is provided additionally, the whole device does not have a large increase in size and weight, since the airing gaps 22A and 22B are provided along the holding plate 21. This makes it possible to provide an excellent liquid crystal display backlight which can, unlike the conventional ones, reduce the size and weight of the whole device even if the heat dissipating function is provided, and can provide a liquid crystal display device using the same.

As described above, the first exemplary embodiment can provide following effects.

(1) Each of the plurality of LEDs 17, 18 is held to the holding plate 21, and the holding plate 21 is disposed by having the airing gaps 22A, 22B formed between it self and each of the mixed-color light guide plates 15, 16. Thus, the holding plate 21 is cooled by the air circulating within the airing gaps 22A, 22B and within the heat-dissipating spatial area 22, so that the heat generated from each of the LEDs 17, 18 can be diffused to the air. As a result, the heat dissipating effect can be improved with a simple structure. Therefore, it is unnecessary to provide an additional mechanism for cooling, so that it is expected to reduce the thickness and weight of the entire device.

(2) At each of the LEDs 17, 18 parts, the guiding reflectors 23, 24 are provided for guiding the output light of each of the LEDs 17, 18 towards the end faces 15A, 16A on the inner sides of the corresponding mixed-color light guide plates 15, 16. Thus, the output light of each of the LEDs 17, 18 can be securely guided even if the mixed-color light guide plate 13 is separated into two mixed-color light guide plates 15, 16 with the heat-dissipating spatial area 22 interposed therebetween. Therefore, the output light from each of the LEDs 17 and 18 can be utilized efficiently.

(3) The heat dissipating mechanism for the LEDs 17, 18 is configured with the heat-dissipating spatial area 22 and the airing gaps 22A, 22B, so that the heat dissipating mechanism can be formed as a space with an expense. This makes it possible to improve the heat dissipating effect further with a simple structure.

(4) The heat-dissipating spatial area 22 is formed in a state to be in parallel to the lateral direction with respect to the upper-side reflector 19 and the lower-side reflector 20. Thus, when forming the heat-dissipating spatial area 22, it may simply be processed to be in parallel to the reflectors 19 and 20. Therefore, the heat-dissipating spatial area 22 can be formed easily.

(5) The holding plate 21 is formed with a material that is excellent in the heat conductivity and has small specific gravity, e.g., a metal-made member such as aluminum. Therefore, it is possible to improve the heat dissipating effect further and to lighten the device.

(6) Since the light isolator plate 12 is provided between the emission light guide plate 11 and each of the mixed-color light guide plates 15, 16, it is possible to eliminate leakage of the light passing through the emission light guide plate 11 and each of the mixed-color light guide plates 15, 16 so as to propagate the output light of the LEDs efficiently from each of the mixed-color light guide plates 15, 16 to the emission light guide plate 11.

(7) The liquid crystal display device 1 according to the present invention is formed by combining the liquid crystal display panel 5 prepared in advance and the thin and light liquid crystal display backlight 10 that is excellent in the heat dissipating effect. Therefore, it is possible to improve the heat dissipating effect with a simple structure, and to reduce the thickness and the weight of the device at the same time.

As described, in the present invention, the heat-dissipating spatial area is provided between each of the mixed-color light guide plates which are mounted on the same plane to be stacked on the back-face side of the emission light guide plate, and each light-emitting device is disposed within the heat-dissipating spatial area. At the same time, the holding plate for holding each of the light-emitting devices is arranged to face each of the mixed-color light guide plates via the airing gaps. Therefore, as an exemplary advantage according to the invention, the holding plate is cooled by heat exchange with the air circulating within the airing gaps, so that the heat generated from the light-emitting devices via the holding plate can be diffused to the air. With this, the heat dissipating effect can be improved with a simple structure.

At the same time, as another exemplary advantage according to the invention, the holding plate is disposed along each of the mixed-color light guide plates to be able to diffuse the heat from both faces to the outside, so that the efficiency for diffusing the heat can be increased. Further, there is no externally protruded part, so that it is possible to suppress increase in the scale of the entire apparatus and a large increase in the weight thereof. This makes it possible to provide an excellent liquid crystal display backlight which can, unlike the conventional ones, reduce the size and weight of the whole device even if the heat dissipating function is provided, and can provide a liquid crystal display device using the same.

Second Exemplary Embodiment

Next, a second exemplary embodiment of the present invention will be described by referring to FIG. 3-FIG. 4.

Note here that the same reference numerals are applied to the same structural members as those of the first exemplary embodiment described above.

In a liquid crystal display backlight 10A of the second exemplary embodiment, a heat-dissipating spatial area 32 is set to be in parallel in the perpendicular direction with respect to a right-side reflector 29 and a left-side reflector 30 which are disposed in parallel to each other and extended in the vertical direction.

Specifically, the second exemplary embodiment can be characterized as follows. That is, the right-side reflector 29 and the left-side reflector 30 are disposed, respectively, in the short-side part of an emission light guide plate 31. At the same time, one and the other mixed-color light guide plates 35, 36 in a same shape and size are arranged by corresponding to each of the reflectors 29, 30. The above-described heat-dissipating spatial area 32 is provided in parallel to each of the reflectors 29, 30 between the inner-side end faces of each of the mixed-color light guide plates 35, 36 on the same plane.

That is, in the liquid crystal display backlight 10 of the first exemplary embodiment, the plurality of LEDs 17, 18 arranged in two rows configure linear rows extending in parallel along the long sides of the rectangular emission light guide plate 11. Meanwhile, in the liquid crystal display backlight 10A of the second exemplary embodiment, the plurality of LEDs 17, 18 arranged in two rows configure linear rows extending in parallel along the short sides of the rectangular emission light guide plate 31. This is basically the different point. Other structures thereof are the same as those of the first exemplary embodiment described above.

Figure 4:
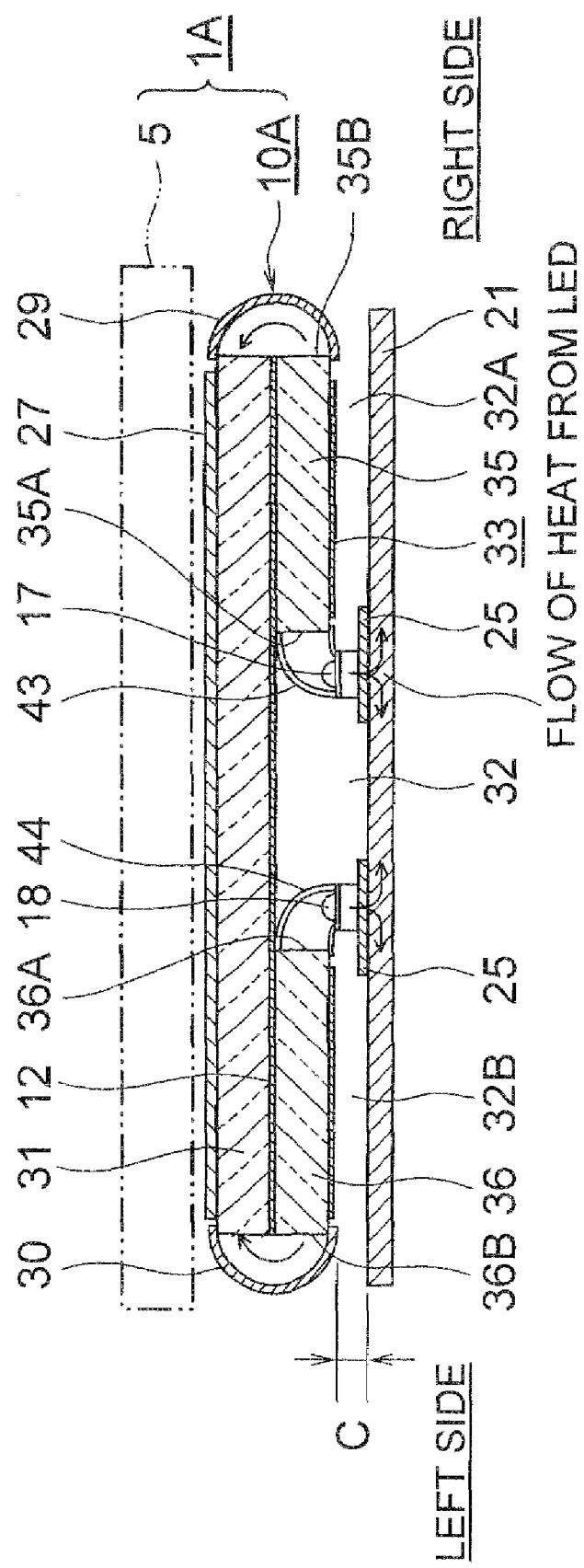
FIG. 4 is a longitudinal section taken along a line IV-IV of FIG. 3.

As shown in FIG. 3 and FIG. 4, in the liquid crystal display backlight 10A of the second exemplary embodiment, the plurality of LEDs 17, 18 are mounted on the surface of the holding plate 21 via the substrate 25, and guiding reflectors 43, 44 are provided to each of the LEDs 17, 18. These reflectors 43, 44 are different from the guiding reflectors 23, 24 of the first exemplary embodiment in terms of the entire length, but have the same structure and effect.

In FIG. 3, the guiding reflectors 43, 44 are extended along the vertical direction with respect to the lateral direction, and each of the mixed-color light guide plates 35, 36 is disposed on the outer sides in the lateral direction with respect to the LEDs 17, 18. The heat-dissipating spatial area 32 is formed between each of the mixed-color light guide plates 35, 36 on the same plane as that of the mixed-color light guide plates 35, 36.

The light outputted from the above-described LEDs 17, 18 is converged into the guiding reflectors 43, 44 and propagated to make incident within each of the mixed-color light guide plates 35, 36 from the opposing side-end faces 35A, 36A of the respective mixed-color light guide plates 35, 36. The light then passes through the inside thereof and is then sent to the emission light guide plate 31 via the right-side reflector 29 and the left-side reflector 30 from the end faces 35D, 36B on the opposing side-end faces 35A, 36A.

Each of the mixed-color light guide plates 35, 36 corresponds to each of the mixed-color light guide plates 15, 16 of the first exemplary embodiment, and the heat-dissipating spatial area 32 also corresponds to the heat-dissipating spatial area 22. Further, the both reflectors 29, 30 correspond to the reflectors 19, 20 of the first exemplary embodiment, and the emission light guide plate 31 corresponds to the emission light guide plate 11.

Airing layered gaps 32A, 32B corresponding to the airing gaps 22A, 22B are formed between the holding plate 21 and each of the mixed-color light guide plates 35, 36, and a cooling mechanism is configured with the airing gaps 32A, 32B and the heat-dissipating spatial area 32. With this, the heat generated from each of the LEDs 17, 18 is smoothly heat-exchanged and dissipated from the holding plate 21 to the air circulating within the gaps 32A, 32B along the holding plate 21.

Other structures and the operational effects are the same as those of the first exemplary embodiment described above.

Further, as shown in FIG. 4, a liquid crystal display panel 5 prepared in advance is disposed in front of the irradiation side of the liquid crystal display backlight 10A in the structure described above. In the second exemplary embodiment, a liquid crystal display device 1A is configured by combining the backlight 10A and the liquid crystal display panel 5.

The second exemplary embodiment is structured and functions as described above. Thus, the second exemplary embodiment can achieve almost the same operational effects as those of the first exemplary embodiment described above, and achieve following effects in addition.

(8) The LEDs 17, 18 are arranged in the vertical direction with respect to the lateral direction of FIG. 3, and the heat-dissipating spatial area 32 is set to be in parallel to the right-side reflector 29 and the left-side reflector 30 extended in the vertical direction in the drawing. Thus, there is no obstacle in the rising direction of the natural convection of the air. Therefore, the heat generated from the plurality of LEDs 17, 18 can be efficiently diffused by the natural convection of the air.

Third Exemplary Embodiment

Next, a third exemplary embodiment of the present invention will be described by referring to FIG. 5.

Note here that the same reference numerals are applied to the same structural members as those of the second exemplary embodiment described above.

Figure 5:
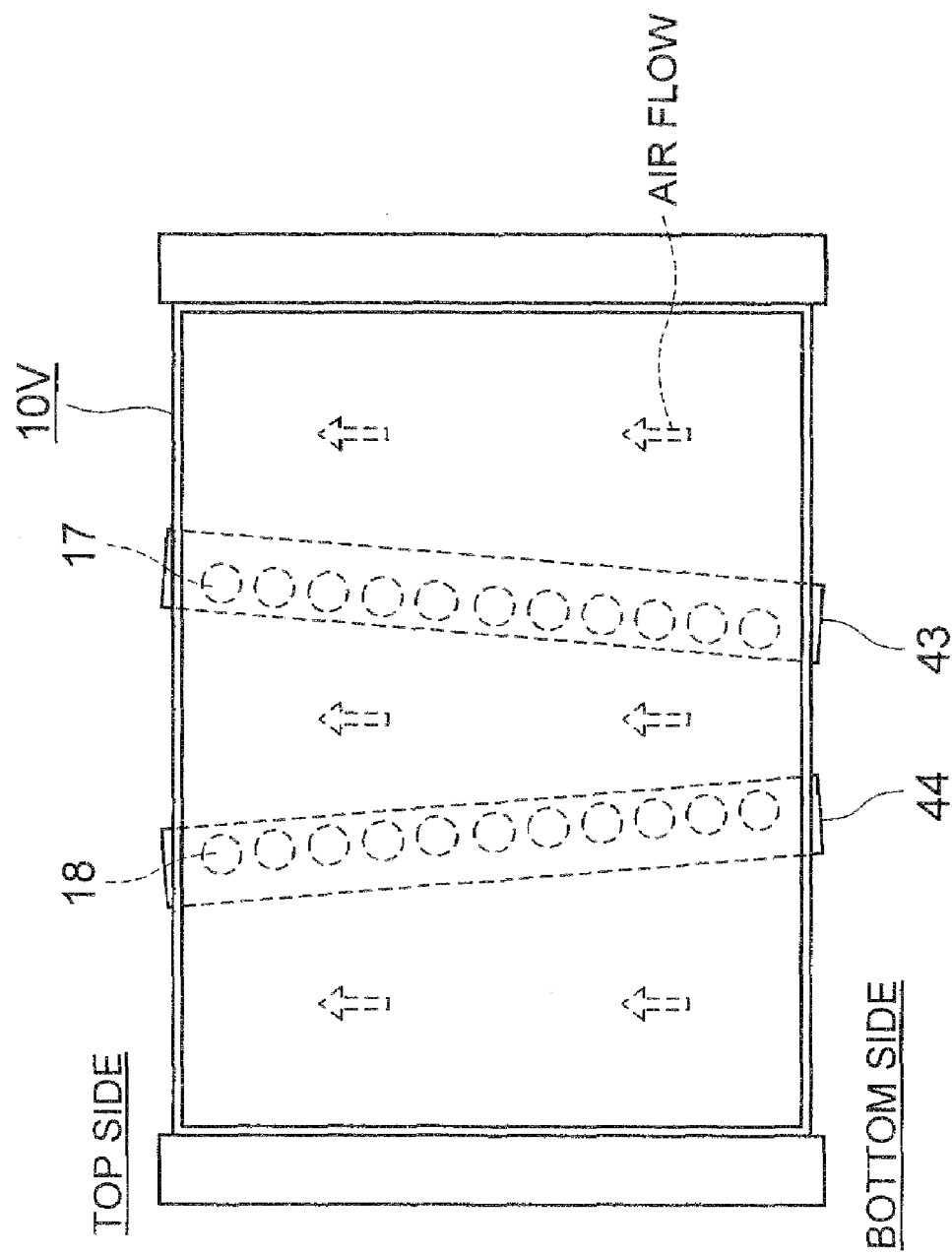
FIG. 5 is an entire front elevational view showing a third exemplary embodiment of the liquid crystal display backlight and the liquid crystal display device according to the invention.

In a liquid crystal display backlight 10V of the third exemplary embodiment, a heat-dissipating spatial area 32 surrounded by the LEDs 17, 18, the guiding reflectors 43, 44, the holding plate 21, and the light isolator plate 12 is formed in a shape where the upper side in FIG. 5 becomes wider than the lower side thereof, i.e., inverted trapezoid.

That is, regarding the heat-dissipating spatial area 32, each of the inner-side end faces (side-end faces) 35A, 26A for configuring the heat dissipating spatial area 32 are set to be in non-parallel to the extending direction of the right-side reflector 29 and the left-side reflector 30 described above. Other structures are the same as those of the second exemplary embodiment described above.

Thus, the third exemplary embodiment can achieve almost the same operational effects as those of the second exemplary embodiment described above, and achieve following effects in addition.

(9) The LEDs 17, 18 are arranged to be tilted by a prescribed angle from the perpendicular direction, and the heat-dissipating spatial area 32 is set to be in non-parallel to the right-side reflector 29 and the left-side reflector 30 while being formed to have wider space on the upper side with respect to the lower side. Thus, in addition to having no obstacle in the rising direction of the natural convection of the air, the heat generated and arise from the plurality of LEDs 17, 18 can be caught in the wide space. Therefore, the heat can be diffused more efficiently.

Fourth Exemplary Embodiment

Figure 6:
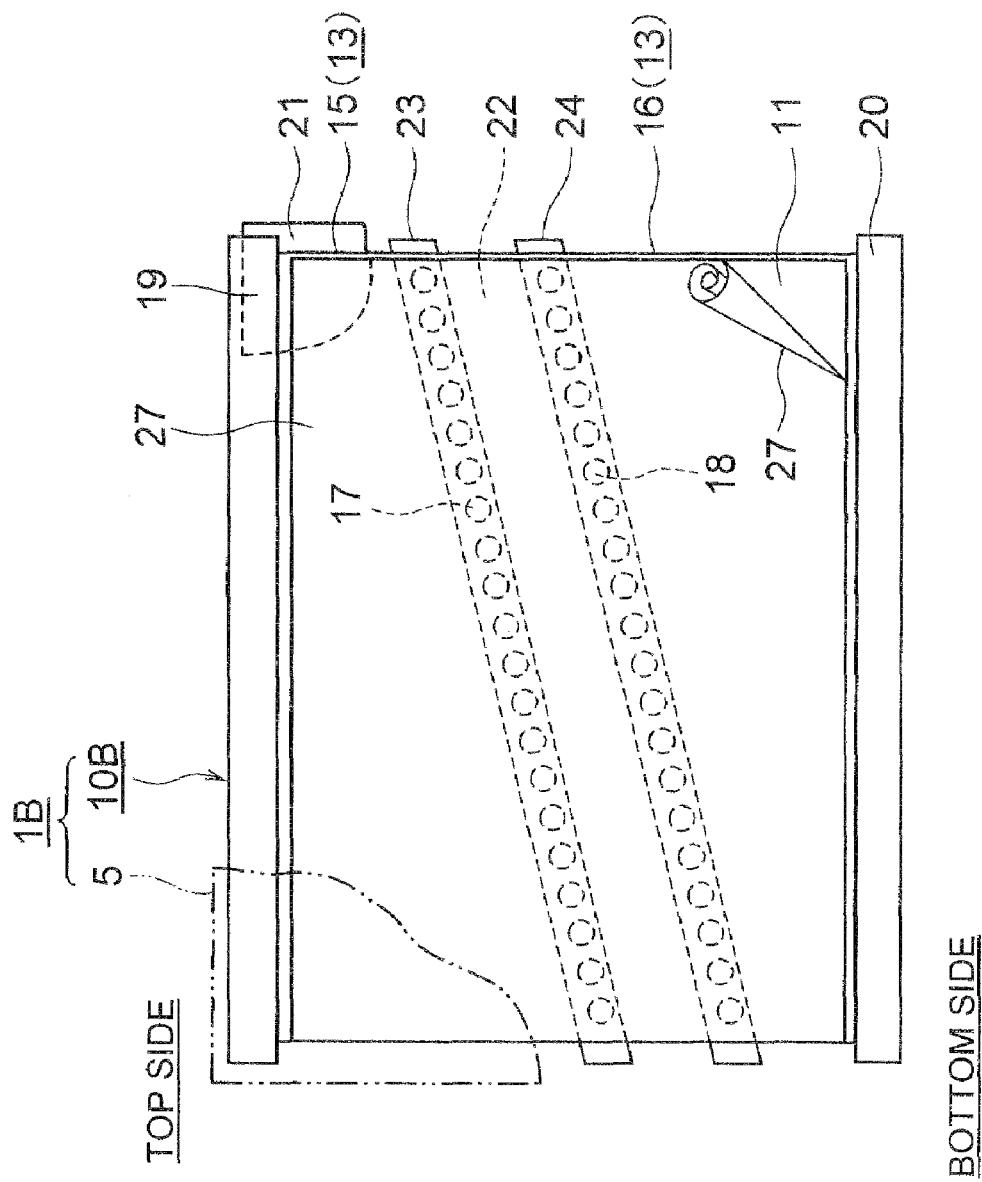
FIG. 6 is an entire front elevational view showing a fourth exemplary embodiment of the liquid crystal display backlight and the liquid crystal display device according to the invention.

Next, a fourth exemplary embodiment of the present invention will be described by referring to FIG. 6.

Note here that the same reference numerals are applied to the same structural members as those of the first exemplary embodiment described above.

A liquid crystal display backlight 10B of the fourth exemplary embodiment is distinctive in respect that the heat-dissipating spatial area 22 is set to be tilted by a prescribed angle of α degree with respect to the upper-side reflector 19 and the lower-side reflector 20.

That is, in the liquid crystal display backlight 10B of the fourth exemplary embodiment, the plurality of LEDs 17, 18 arranged in two rows are tilted by the prescribed angle of α degree with respect to the both reflectors 19 and 20, and the heat-dissipating spatial area 22 including the provided positions of the LEDs 17, 18 is formed on the back-face side of the emission light guide plate 11 also tilted by the prescribed angle of α degree. Reference numerals 15 and 16 indicate each of the mixed-color light guide plates which set the heat-dissipating spatial area 22 to be in a tilted state by the prescribed angle of α degree.

The positional relation regarding each of the mixed-color light guide plates 15, 16 and the emission light guide plate 11 within the section is the same as the case of the above-described first exemplary embodiment shown in FIG. 2. Other structures are the same as those of the first exemplary embodiment described above.

Further, as shown in FIG. 5, a liquid crystal display panel 5 prepared in advance is disposed in front of the irradiation side of the liquid crystal display backlight 10B in the structure described above. In the fourth exemplary embodiment, a liquid crystal display device 1B is configured by combining the backlight 10B and the liquid crystal display panel 5.

The same reference numerals as those of the first exemplary embodiment are applied to the heat-dissipating spatial area 22 and the guiding reflectors 23, 24 of the fourth exemplary embodiment, since those are almost the same in terms of the functions even though the lengths thereof are different in a strict sense. Other structures and the operational effects are the same as those of the first exemplary embodiment.

The fourth exemplary embodiment is structured and functions as described above. Thus, the fourth exemplary embodiment has almost the same functions as those of the first exemplary embodiment described above. In addition, it is possible to obtain following effects.

(10) The entire length of the heat-dissipating spatial area 22 can be made longer than the case where it is formed to be in parallel to the reflectors 19, 20. As a result, there are more LEDs 17, 18 disposed in two rows, so that the brightness can be increased.

Fifth Exemplary Embodiment

Next, a fifth exemplary embodiment of the present invention will be described by referring to FIG. 7.

Note here that the same reference numerals are applied to the same structural members as those of the fourth exemplary embodiment described above.

Figure 7:
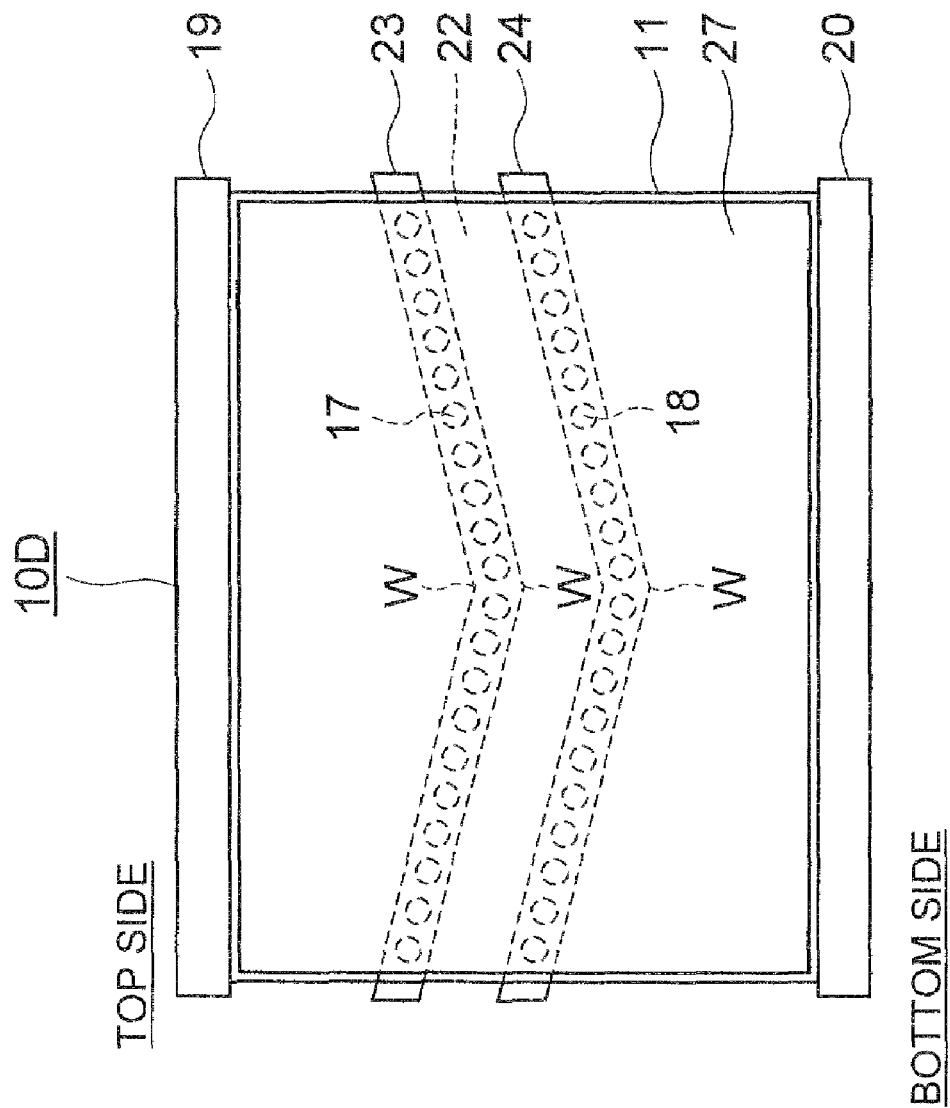
FIG. 7 is an entire front elevational view showing a fifth exemplary embodiment of the liquid crystal display backlight and the liquid crystal display device according to the invention.

A liquid crystal display backlight 10D according to the fifth exemplary embodiment is distinctive in respect that the heat-dissipating spatial area 22 of the fourth exemplary embodiment is formed with its upper side bent in a V-letter form to be wide open as in FIG. 7 within a plane in parallel to the above-described emission light guide plate 11. That is, it is distinctive in respect that the LEDs 17, 18, the upper-side reflector 19, the lower-side reflector 20, and the side-end faces (end faces on the inner side) of the mixed-color light guide plates 15A, 16A are formed to have respective bent point W on the lower sides thereof.

In that case, in the fifth exemplary embodiment, both end parts extended on the left and right sides of the bent heat-dissipating spatial area 22 are arranged to be higher than the bent point W, as in FIG. 7. Other structures are the same as those of the fourth exemplary embodiment.

The fifth exemplary embodiment having such structure can achieve almost the same operational effects as those of the fourth exemplary embodiment described above, and achieve following effects in addition further.

(11) Since the heat-dissipating spatial area 22 is bent as described above, it is possible to diffuse the heat in each of the area efficiently at the bent points W as the boundary, without reducing the number of LEDs 17 and 18.

Sixth Exemplary Embodiment

Next, a sixth exemplary embodiment of the present invention will be described by referring to FIG. 8-FIG. 9.

Note here that the same reference numerals are applied to the same structural members as those of the second exemplary embodiment (FIG. 3-FIG. 4) described above.

A liquid crystal display backlight 10C according to the sixth exemplary embodiment is distinctive in respect that a heat sink 65 as a heat-dissipating auxiliary device is provided within the heat-dissipating spatial area 32 that is provided to the liquid crystal display backlight 10A (see FIG. 3) of the second exemplary embodiment described above, and the heat sink 65 is fixed to the holding plate 21 described above.

Figure 8:
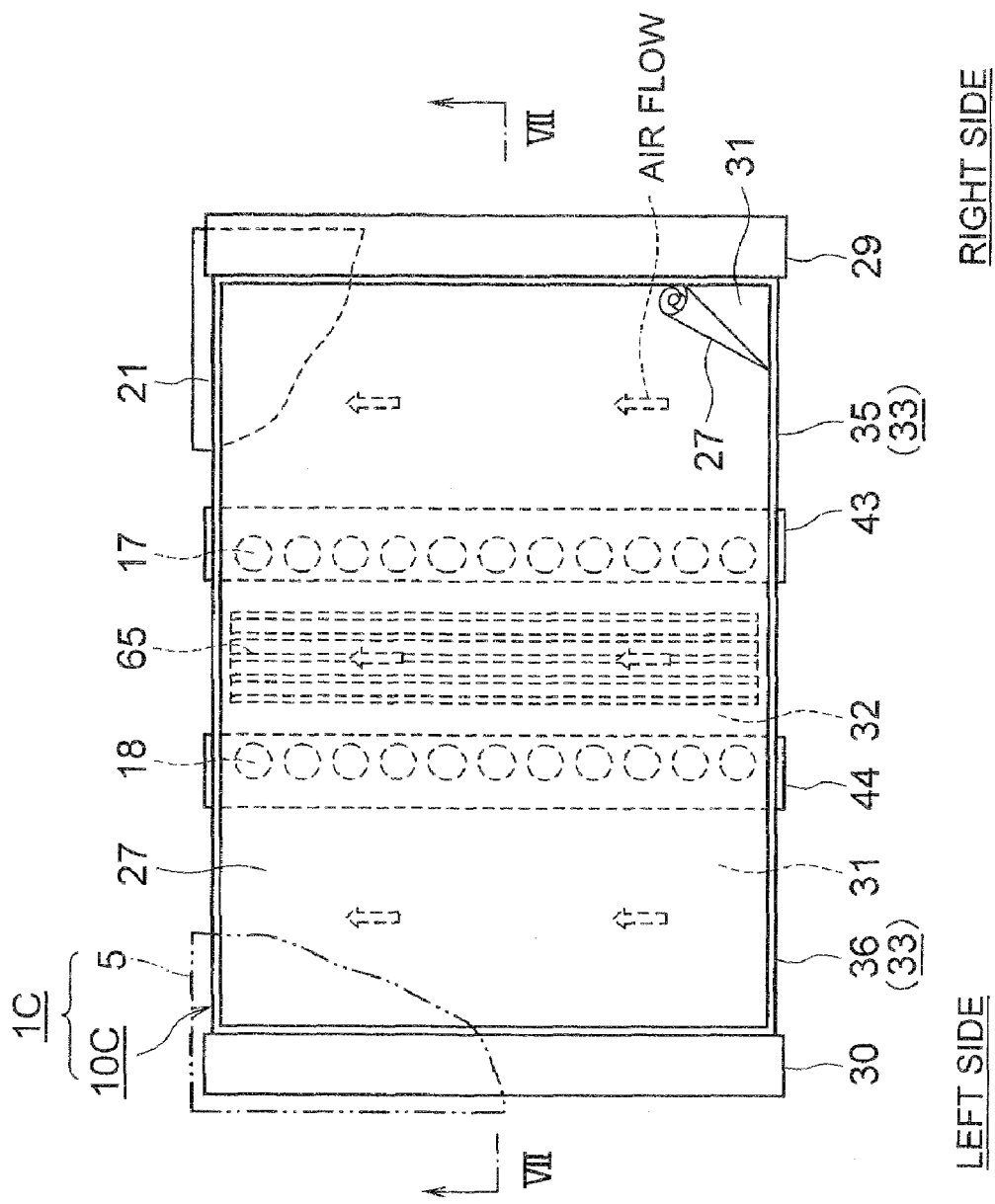
FIG. 8 is an entire front elevational view showing a sixth exemplary embodiment of the liquid crystal display backlight and the liquid crystal display device according to the invention.
Figure 9:
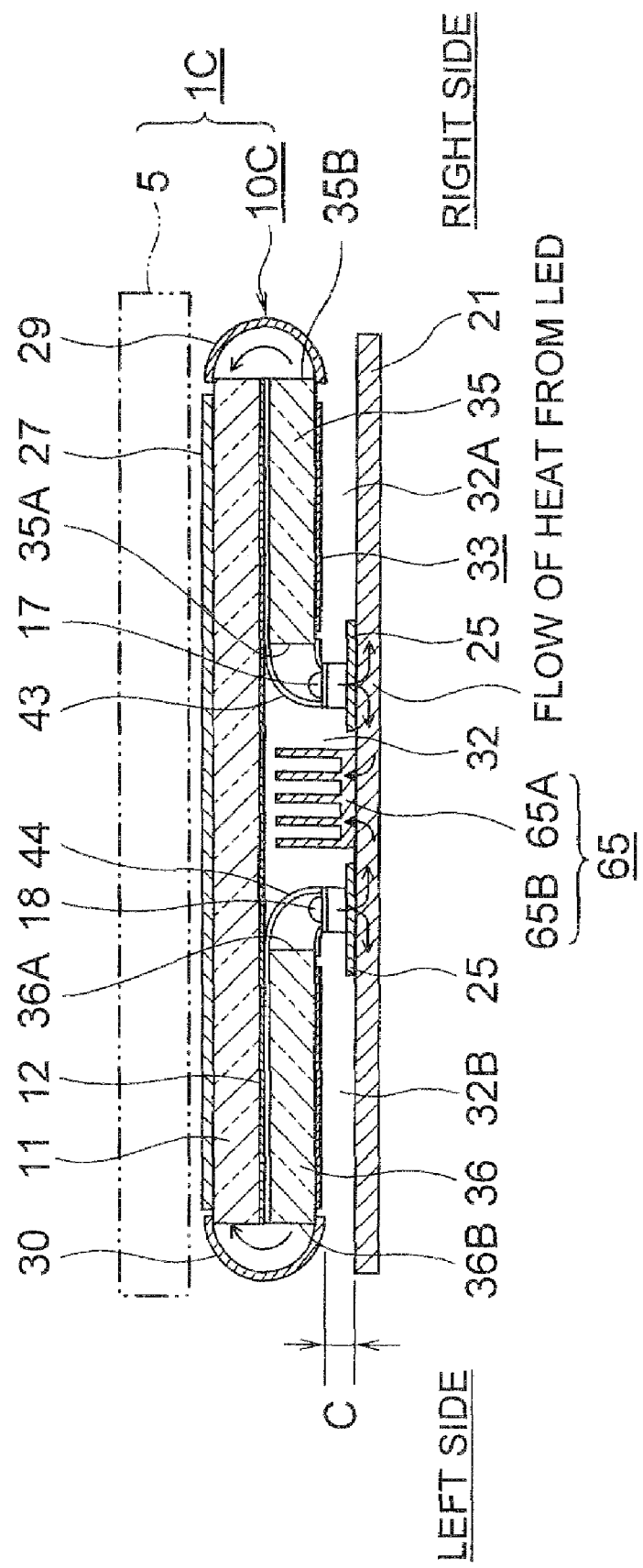
FIG. 9 is a longitudinal section taken along a line VII-VII of FIG. 8.

As shown in FIG. 8 and FIG. 9, the heat sink 65 is provided along substantially the whole length of the backlight 10C in the vertical direction (width direction) of FIG. 8, and it is fixed to the surface of the holding plate 21 as shown in FIG. 9.

As the heat sink 65, used in this exemplary embodiment is a type in which a plurality of fins 65B continued in the vertical direction of FIG. 8 are provided on a base part 65A continued in the vertical direction. This heat sink 65 is formed with aluminum or the like which is excellent in heat conductivity and small in specific gravity. Therefore, the heat transferred from the LEDs 17, 18 to the holding plate 21 is propagated to the heat sink 65, so that the heat generated from each of the LEDs 17, 18 can be effectively diffused to the outside via the heat sink 65.

Other structures and the operational effects are the same as those of the second exemplary embodiment (FIG. 3-FIG. 4) described above.

Further, as shown in FIG. 9, a liquid crystal display panel 5 prepared in advance is disposed in front of the irradiation side of the liquid crystal display backlight 10C in the structure described above. In the sixth exemplary embodiment, a liquid crystal display device 1C is configured by combining the backlight 10C and the liquid crystal display panel 5.

The sixth exemplary embodiment is structured and functions as described above. Thus, the sixth exemplary embodiment has almost the same functions as those of the second exemplary embodiment described above. In addition, it is possible to obtain following effects.

(12) The heat sink 65 is provided within the heat-dissipating spatial area 32 as described above. Thus, the heat dissipating effect can be improved by cooling the holding plate 21 with the air circulating within the heat-dissipating spatial area 32. Further, the heat dissipating effect with heat dissipation of the heat sink 65 can also be expected, so that the heat dissipating effect can be improved further.

Furthermore, the heat sink 65 is arranged on the inner side which is the same plane where the holding plate 21, the LEDs 17, 18, and the like are disposed, so that it does not hinder the thinning of the device.

Seventh Exemplary Embodiment

Next, a seventh exemplary embodiment of the present invention will be described by referring to FIG. 10.

Note here that the same reference numerals are applied to the same structural members as those of the second exemplary embodiment (FIG. 3-FIG. 4) described above.

A liquid crystal display backlight 10D according to the seventh exemplary embodiment is distinctive in respect that a cooling fan 75 as a heat-dissipating auxiliary device is provided within the heat-dissipating spatial area 32 that is provided to the liquid crystal display backlight 10A of the second exemplary embodiment described above. Further, the cooling fan 75 is fixed to the holding plate 21 described above at its bottom face part, in such a manner that the whole body is fitted within the heat-dissipating spatial area 32.

Therefore, the heat transmitted to the holding plate 21 from the plurality of LEDs 17, 18 is effectively heat-exchanged by an air blast from the cooling fan 75 and diffused efficiently to the outside air via the airing gaps 32A, 32B along with the air heated inside air. Other structures are the same as those of the second exemplary embodiment described above.

Figure 10:
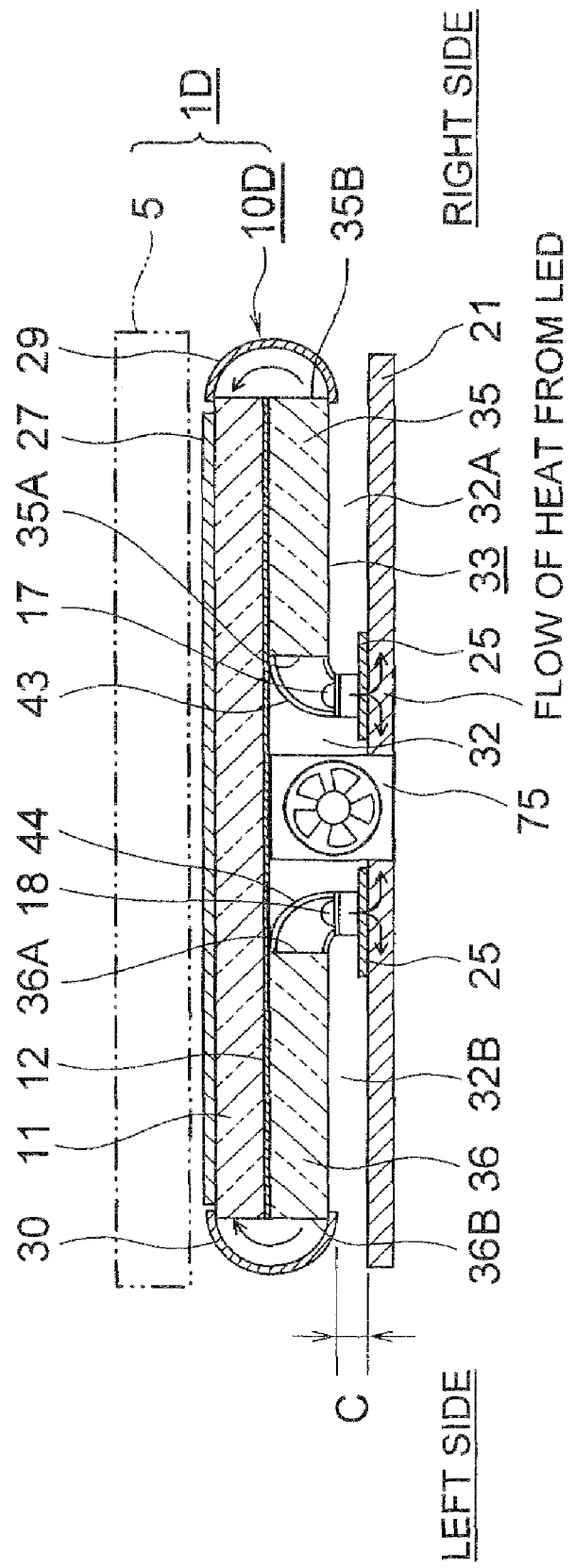
FIG. 10 is an entire front elevational view showing a seventh exemplary embodiment of the liquid crystal display backlight and the liquid crystal display device according to the invention.

Further, as shown in FIG. 10, a liquid crystal display panel 5 prepared in advance is disposed in front of the irradiation side of the liquid crystal display backlight 10D in the structure described above. In the seventh exemplary embodiment, a liquid crystal display device 1D is configured by combining the backlight 10D and the liquid crystal display panel 5.

The seventh exemplary embodiment is structured and functions as described above. Thus, the seventh exemplary embodiment has almost the same functions as those of the second exemplary embodiment described above. In addition, it is possible to obtain following effects.

(13) In addition to discharging the heated air inside the heat-dissipating spatial area 32 forcibly to the outside by the cooling fan 75 that is provided inside the heat-dissipating spatial area 32, the holding plate 21 is heat-exchanged forcibly as an air-cooling target. Therefore, the heat dissipating effect can be improved still further compared to the conventional case.

The present invention is not to be limited to the contents disclosed in each of the above-described exemplary embodiments. It is to be understood that the present invention includes various modification and changes within the range with which the objects of the present invention can be achieved.

For example, there have been described that the structure of providing the heat sink 65 to the inside the heat-dissipating spatial area 22 of the liquid crystal display backlight 10A according to the second exemplary embodiment is defined as the fourth exemplary embodiment, and the structure of providing the cooling fan 75 to the inside the heat-dissipating spatial area 22 of the liquid crystal display backlight 10A according to the second exemplary embodiments is defined as the seventh exemplary embodiment. However, it is not intended to limit the mounting target of the heat sink 65 and the cooling fan 75 essentially to the liquid crystal display backlight 10A of the second exemplary embodiment.

Further, the heat sink 65 may be provided to the inside the heat-dissipating spatial area 22 of the liquid crystal display backlight 10 of the first exemplary embodiment, or to the inside the heat-dissipating spatial area 22 of the liquid crystal display backlight 10B of the fourth exemplary embodiment.

Furthermore, the cooling fan 75 may be provided to the inside the heat-dissipating spatial area 22 of the liquid crystal display backlight 10 of the first exemplary embodiment, or to the inside the heat-dissipating spatial area 22 of the liquid crystal display backlight 10B of the fourth exemplary embodiment.

Further, a great number of uneven parts 80 may be provided at least on one of the surfaces of the holding plate 21 according to each of the exemplary embodiments.

Figure 11A:
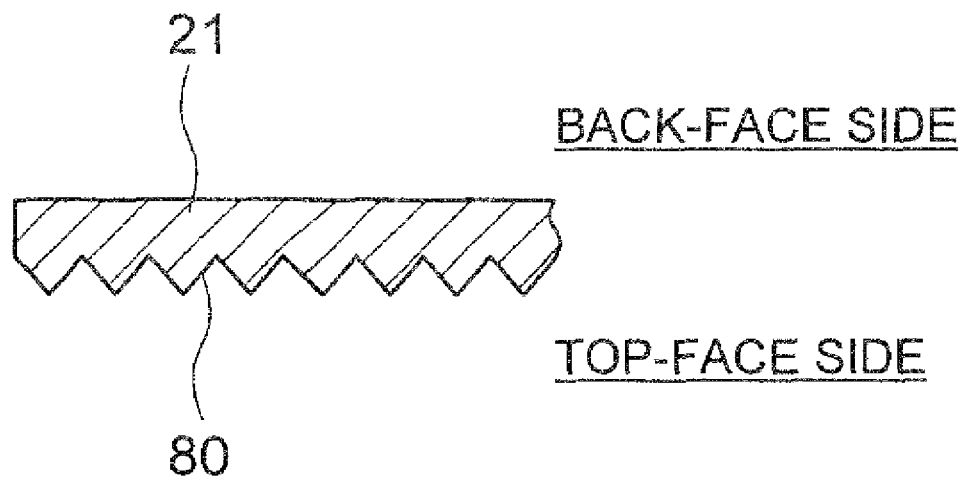
FIG. 11A is an illustration for describing a sawtooth type uneven part and FIG. 11B is an illustration for describing a sine-curve type uneven part.
Figure 11B:
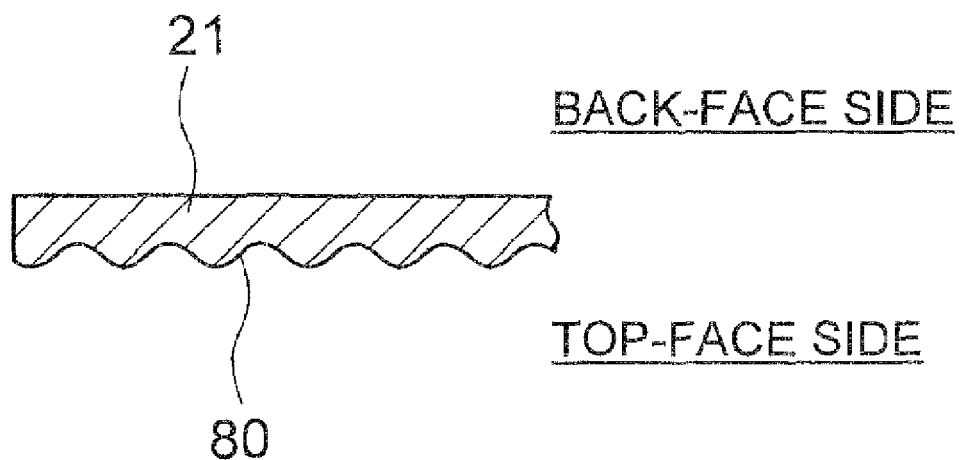
Figure 12:
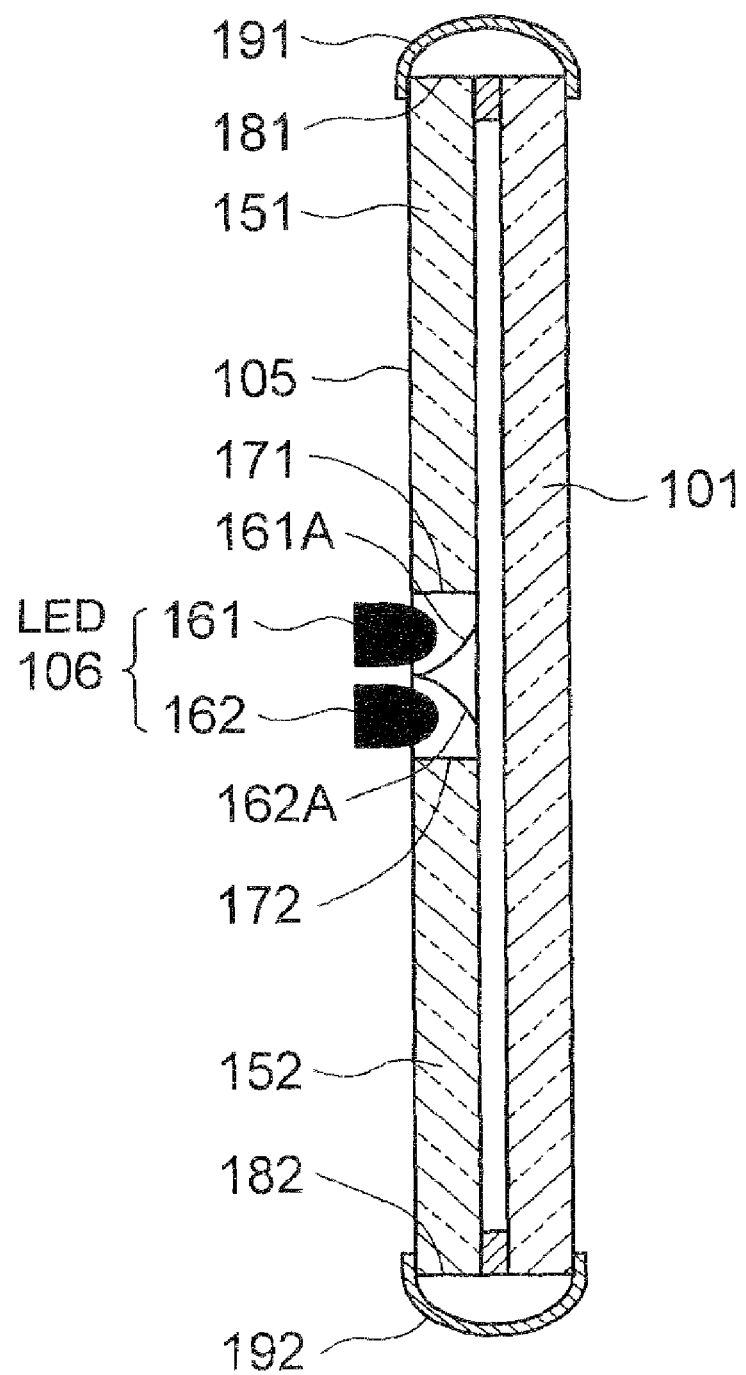
FIG. 12 is a longitudinal section showing a lighting unit that uses a liquid crystal backlight according to a related technique.

That is, the uneven shapes 80 having saw-tooth section may be formed on the surface of one of the faces of the holding plate 21 according to each of the above-described exemplary embodiments as shown in FIG. 11A, or the uneven shapes 80 having waveform section may be formed on the surface of the holding plate 21 as shown in FIG. 11B.

With this, the surface area (heat-dissipating area) of the holding plate 21 can be increased, which makes it possible to improve the heat dissipating effect.

A great number of uneven shapes, e.g., the uneven shapes 80 as shown in FIG. 11A and FIG. 11B, may also be provided on the back face that is the other face of the holding plate 21, or may be provided on both faces thereof. Further, the shape of the unevenness is not limited to those shown in FIG. 11A and FIG. 11B. For example, a shape having a great number of semicylindrical protrusions, etc. may be employed. The point is that any shapes can be employed as log as it is possible to increase the surface area of the holding plate 21 to improve the heat dissipating effect.

Further, while the LEDs 17, 18 arranged linearly in two rows are disposed obliquely from the upper right side towards the lower left side in the fourth exemplary embodiment described above, the LEDs may be disposed obliquely in the inverted direction. That is, the LEDs may be disposed obliquely from the upper left side towards the lower right side.

Example of utilizing the present invention may be liquid crystal display devices to be used for televisions and monitors, backlights (back lighting device) used for signboards, advertisement media, and the like.

While the present invention has been described above by referring to each of the exemplary embodiments, the present invention is not limited to those exemplary embodiments. Various changes and modifications that occur to those skilled in the art may be applied to the structures and details of the present invention. Further, it is to be understood that the present invention includes combinations of a part of or the whole part of the structures described in each of the exemplary embodiments.

What is claimed is:

1. A liquid crystal, display backlight, comprising: an emission light guide plate for emitting illuminating light for a liquid crystal display panel from one face; one mixed-color light guide plate and other mixed-color light guide mounted respectively on a same plane of other face of the emission light guide plate via a spacer; a heat-dissipating spatial area provided between the one and the other mixed-color light guide plates; a plurality of light-emitting devices disposed within the heat-dissipating spatial area; and one reflecting means and other reflecting means for guiding output light from each of the light-emitting devices propagated inside the one and the other mixed-color light guide plates towards corresponding end faces of the emission light guide plate from outside end faces of each of the mixed-color light guide plates, wherein a holding plate for holding each of the plurality of light-emitting device as one body is provided, and the holding plate is disposed to face the one and the other mixed-color light guide plates with an airing gap provided therebetween.

2. The liquid crystal display backlight as claimed in claim 1, wherein the holding plate is formed in a size corresponding to the emission light guide plate.

3. The liquid crystal display backlight as claimed in claim 1, wherein the heat-dissipating spatial area is set to be communicated with the airing gaps.

4. The liquid crystal display backlight as claimed in claim 3, wherein: the one and the other reflecting means are placed to be in parallel to each other; and one and the other mixed-color light guide plates are formed and mounted to the emission light guide plate in such a manner that the heat-dissipating spatial area becomes in parallel to each of the reflecting means.

5. The liquid crystal display backlight as claimed in claim 3, wherein the heat-dissipating spatial area is provided to be non-parallel to the reflecting means.

6. The liquid crystal display backlight as claimed in claim 5, wherein the heat-dissipating spatial area is provided while having a part thereof being bent within a plane along the emission light guide plate.

7. The liquid crystal display backlight as claimed in claim 3, wherein the heat-dissipating spatial area is set to be tilted by a prescribed angle of $\alpha$ degree with respect to the reflecting means.

8. The liquid crystal display backlight as claimed in claim 3, wherein the plurality of light-emitting devices are arranged separately at least in two rows by corresponding to the one and the other mixed-color light guide plates.

9. The liquid crystal display backlight as claimed in claim 8, comprising, for each row of the plurality of light-emitting devices, a light reflection guide for guiding output light from the plurality of light-emitting devices in each of the rows to end faces of each of the mixed-color light guide plates on the heat-dissipating spatial area side.

10. The liquid crystal display backlight as claimed in claim 9, comprising a heat-dissipating auxiliary device for the holding plate within the heat-dissipating spatial area.

11. The liquid crystal display backlight as claimed in claim 10, wherein: the heat-dissipating auxiliary device is configured with a heat-dissipating heat sink; and the heat-dissipating heat sink is fixed to the holding plate via its bottom-end part.

12. The liquid crystal display backlight as claimed in claim 11, wherein: the heat-dissipating auxiliary device is configured with a cooling fan; and the cooling fan is fixed to the holding plate via its fan holding part.

13. The liquid crystal display backlight as claimed in claim 1, comprising a great number of uneven shapes provided on at least one face of the holding plate.

14. The liquid crystal display backlight as claimed in claim 1, wherein, assuming that distance between an end face of the light reflection guide side, which is an inner-side end face of the mixed-color light guide plate, and an end face of the reflecting means side is D, arranging pitch of the LED is P, and light distribution angle (half-value angle) of the LED is $\theta$, the distance D can be set to satisfy an expression "$D \geq n \times P / \tan(\theta/2)$" (n: number to closest same-color LED).

15. A liquid crystal display device, comprising a liquid crystal display panel and a backlight disposed in back side of the liquid crystal display panel for supplying display irradiation light for the liquid crystal panel, wherein the backlight is the liquid crystal display backlight claimed in claim 1.

* * * * *